(12) United States Patent
Franks, Jr.

(10) Patent No.: US 7,367,534 B2
(45) Date of Patent: May 6, 2008

(54) DROP WIRE CLAMP

(75) Inventor: George J. Franks, Jr., Inverness, IL (US)

(73) Assignee: Senior Industries, Inc., Wood Dale, IL (US)

( * ) Notice: Subject to any disclaimer, the term of this patent is extended or adjusted under 35 U.S.C. 154(b) by 270 days.

(21) Appl. No.: 11/072,584

(22) Filed: Mar. 3, 2005

(65) Prior Publication Data

US 2005/0254768 A1    Nov. 17, 2005

Related U.S. Application Data

(63) Continuation-in-part of application No. 10/815,334, filed on Apr. 1, 2004, now Pat. No. 7,234,669.

(51) Int. Cl.
  *F16L 3/08* (2006.01)
  *F16G 11/00* (2006.01)
  *H02G 7/08* (2006.01)

(52) U.S. Cl. .............. 248/74.1; 24/136 R; 174/40 CC; 403/213; 248/58

(58) Field of Classification Search ............. 248/63, 248/74, 58, 62; 174/41, 40 CC; 24/129 B, 24/129 R, 136 R, 115 M; 403/371, 213, 403/212, 314
See application file for complete search history.

(56) References Cited

U.S. PATENT DOCUMENTS

| | | | | |
|---|---|---|---|---|
| 2,068,368 A | * | 1/1937 | Bouvier et al. | 403/314 |
| 2,131,171 A | * | 9/1938 | Fotsch | 24/136 R |
| 2,472,527 A | * | 6/1949 | Gordon et al. | 403/212 |
| 2,781,212 A | * | 2/1957 | Jugle | 403/213 |
| 2,865,609 A | * | 12/1958 | Steiner | 256/10 |
| 2,968,484 A | * | 1/1961 | Vincent | 473/130 |
| 3,676,208 A | * | 7/1972 | Griffin | 428/149 |
| 4,637,098 A | * | 1/1987 | Okura et al. | 24/136 R |
| 4,939,821 A | * | 7/1990 | Frank, Jr. | 24/136 R |
| 5,050,273 A | * | 9/1991 | Okura | 24/136 R |
| 5,142,745 A | * | 9/1992 | Setty et al. | 24/136 R |
| 5,259,690 A | * | 11/1993 | Legge | 403/385 |
| 5,322,132 A | * | 6/1994 | Franks, Jr. | 174/41 |
| 6,015,417 A | * | 1/2000 | Reynolds, Jr. | 606/151 |
| 6,395,596 B1 | * | 5/2002 | Chien et al. | 438/241 |
| 6,581,251 B2 | * | 6/2003 | Malin | 24/136 R |

* cited by examiner

*Primary Examiner*—Anita M. King
(74) *Attorney, Agent, or Firm*—Bell, Boyd & Lloyd LLP

(57) ABSTRACT

A compression-type drop wire clamp that avoids damaging a signal carrying portion of a cable by applying a compressive force primarily to a support portion of a cable is disclosed herein. A plurality of holes may be included in a compression portion of the clamp to increase the frictional force between the cable and the clamp. An abrasive coating, such as an enamel and crushed glass mixture, may be added to the clamp to increase the frictional force between the cable and the clamp. Tines or other aligning mechanisms may also be used to center the cable in the clamp and/or to align other portions of the clamp (e.g. a shim).

4 Claims, 12 Drawing Sheets

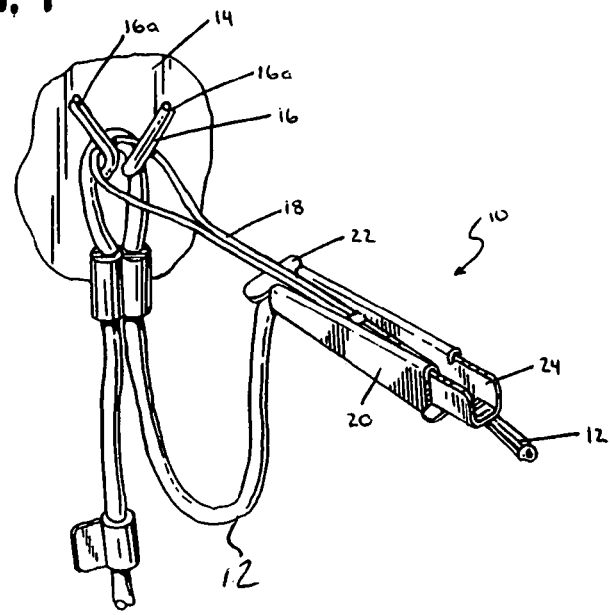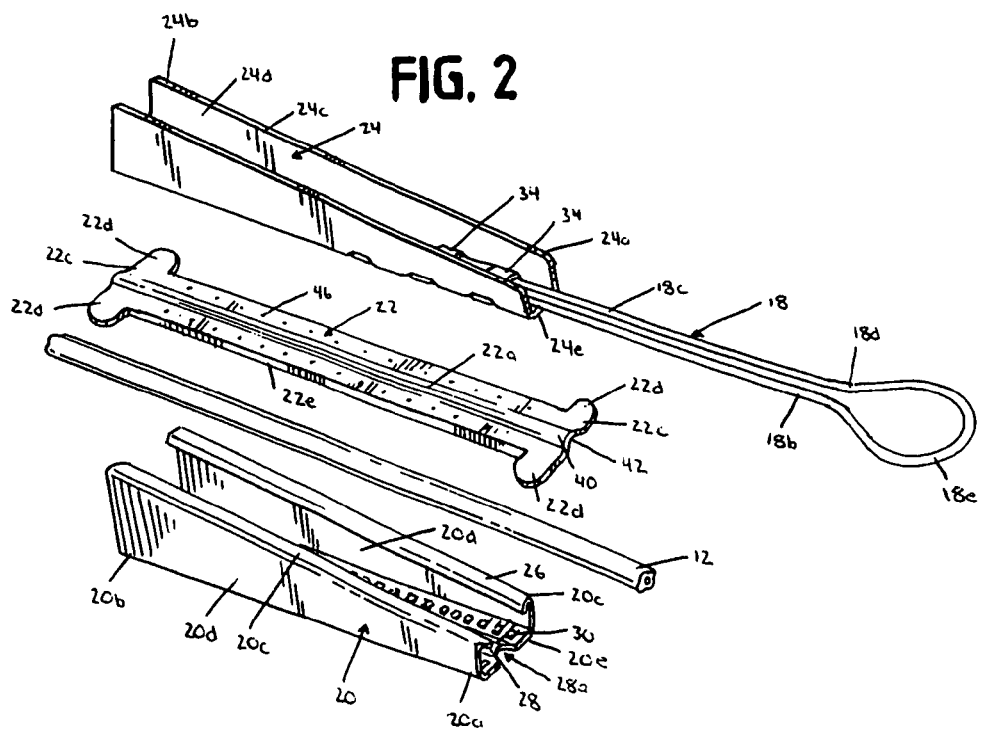

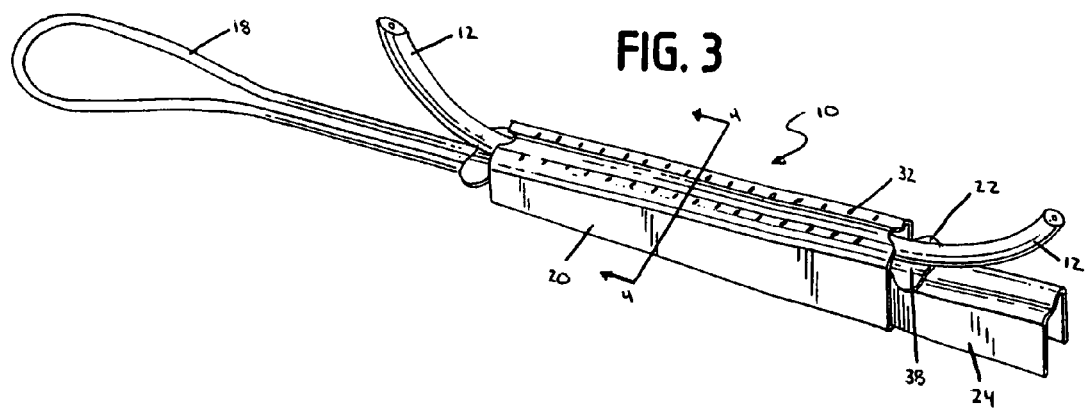
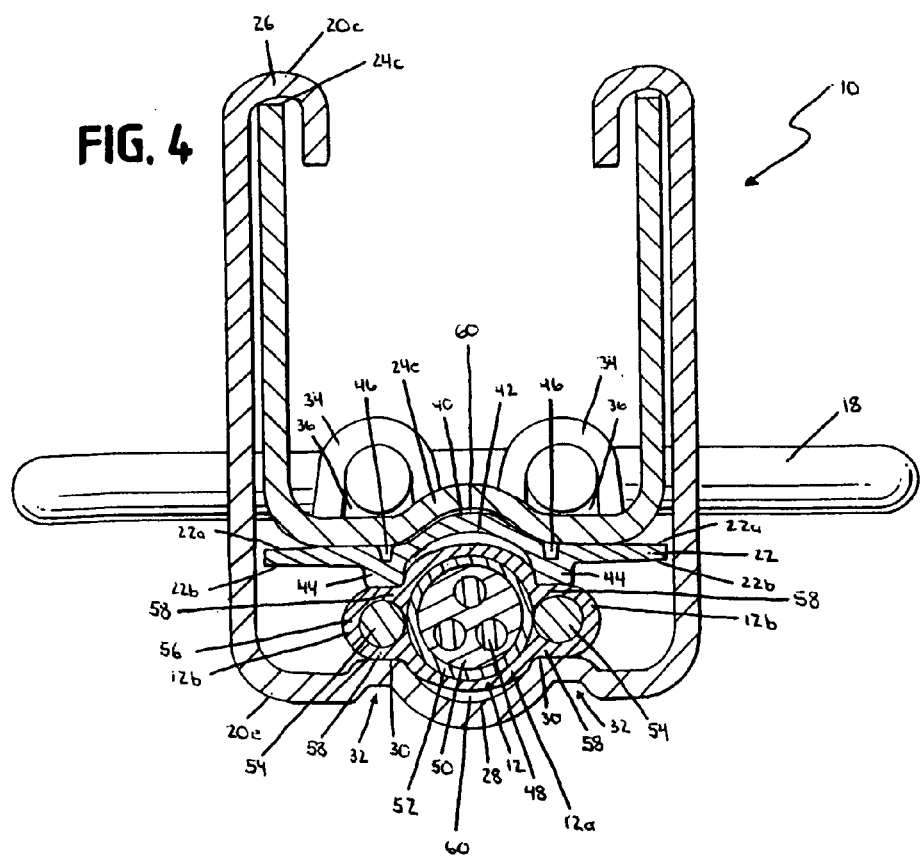

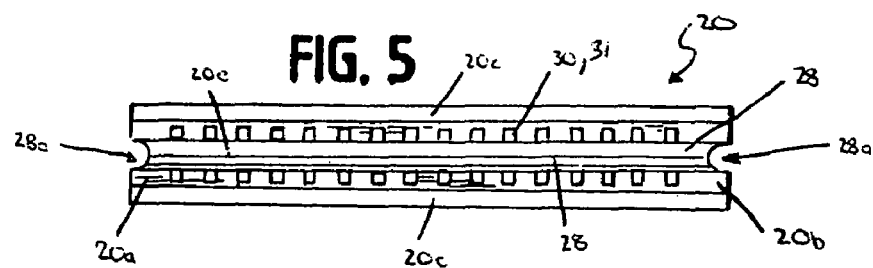
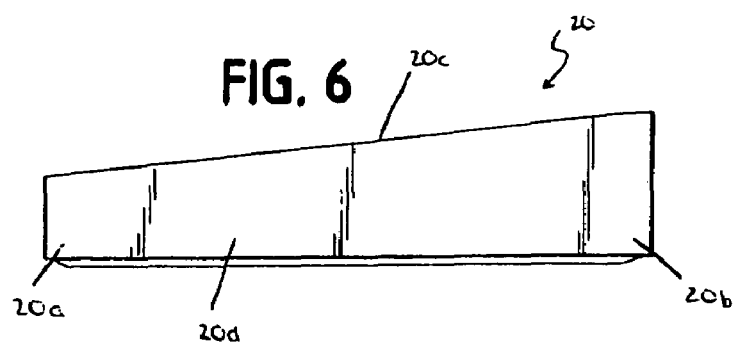
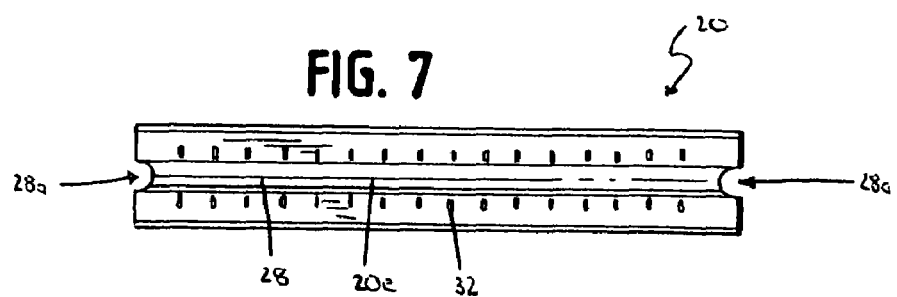

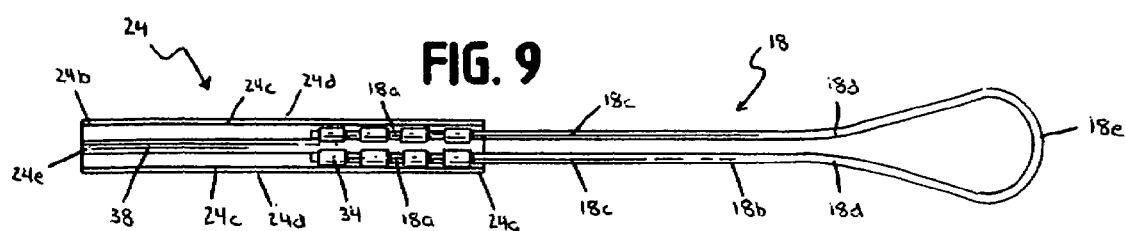
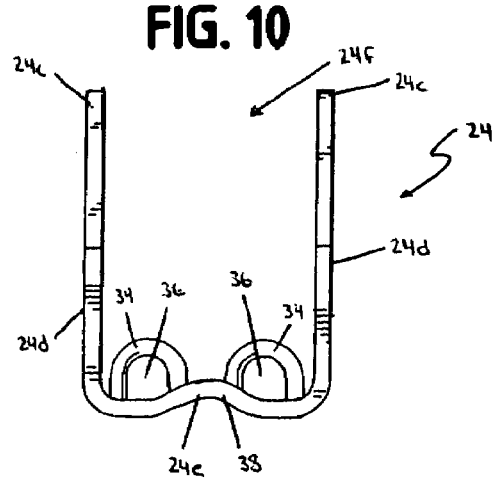

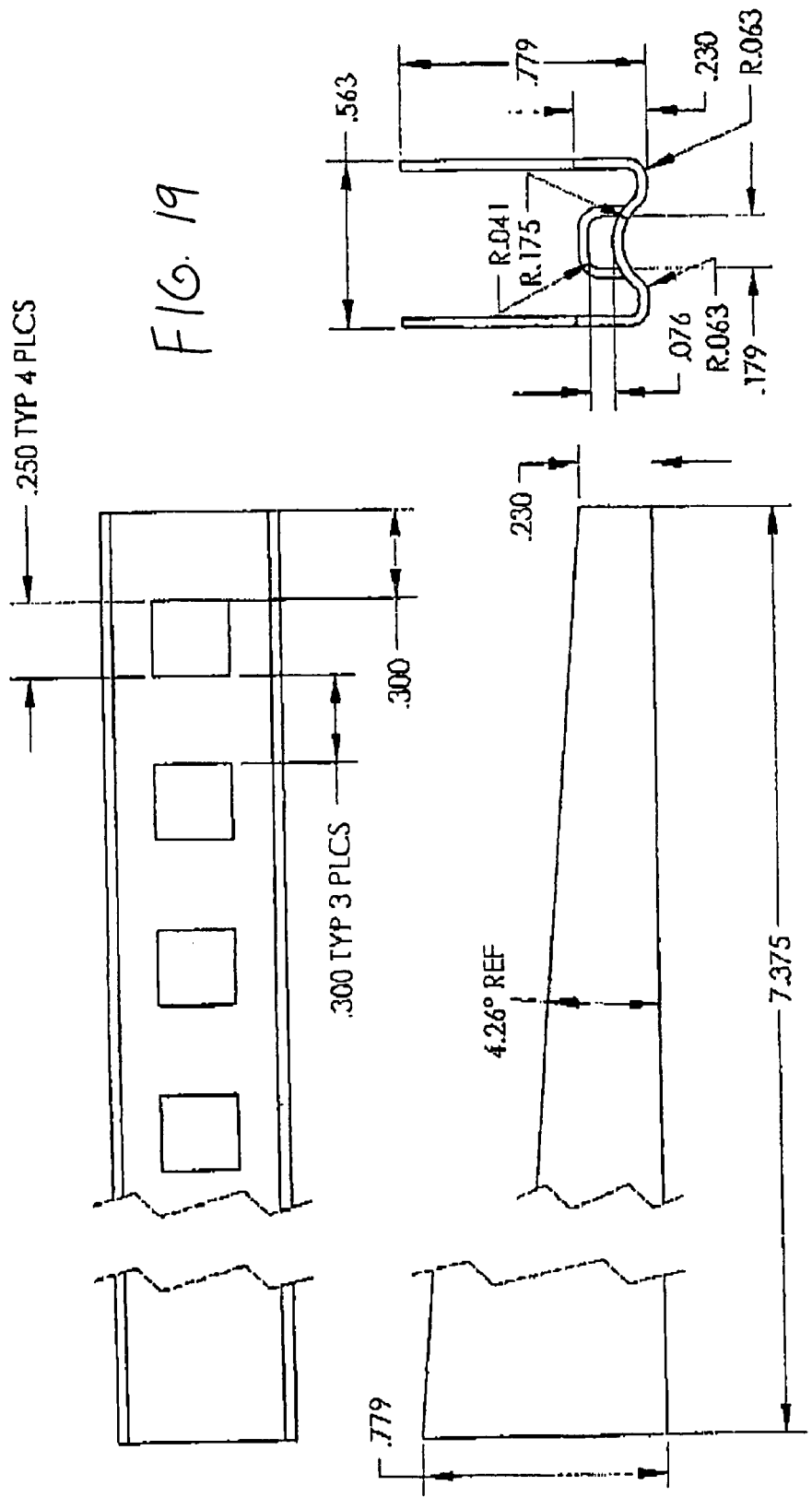

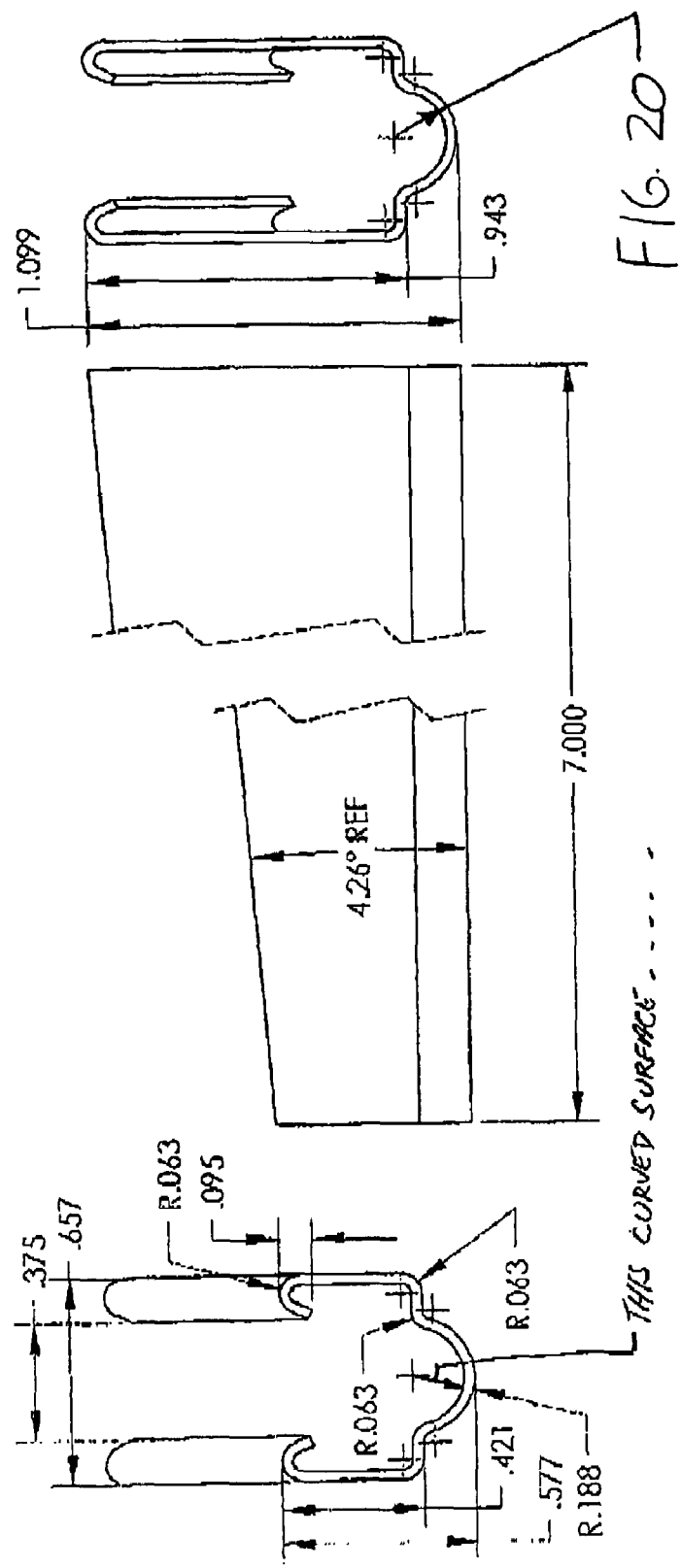

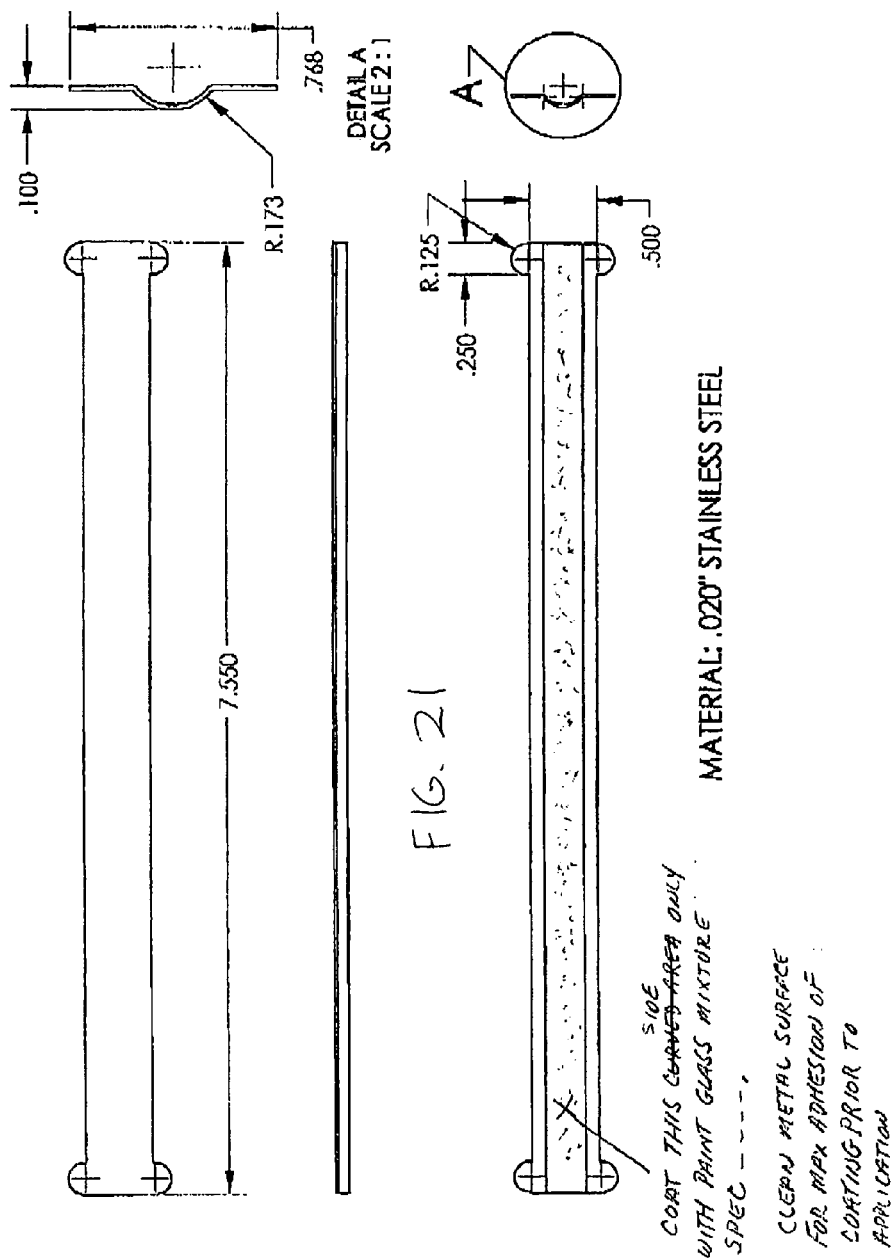

DROP WIRE CLAMP

RELATED APPLICATIONS

The application is a continuation-in-part of U.S. patent application Ser. No. 10/815,334 filed Apr. 1, 2004 now U.S. Pat. No. 7,234,669 which is incorporated herein by reference.

FIELD

The present disclosure relates to clamps and, more particularly, to clamps for suspending and directing a wire or cable relative to a structure such as a pole or building.

BACKGROUND

Various types of clamps are employed to support and direct cables extending between supports and/or structures, such as from a utility pole to a building. One common type of clamp used for such a purpose is conventionally referred to as a drop wire clamp. A drop wire clamp enables a cable or wire, such as a telephone wire or coaxial cable, to be supported and attached to a building, pole, or other support wire in a manner that lessens the potential for compromising the signal transmission capability of the cable or wire. The drop wire clamp also is used because the clamp supports the weight of the cable or wire and maintains tension on the line, while relieving stress on the attachment points of the cable or wire, such as the attachment structure on a pole or building.

Drop wire clamps generally fall into one of two categories: (1) a wire wrap-type drop wire clamp; or (2) a compression-type drop wire clamp. With wire wrap-type drop wire clamps, a wire, such as a portion of a messenger strand, is wrapped around the drop wire clamp to secure the signal carrying cable therein. With compression-type drop wire clamps, the cable or wire is secured to the clamp through pressure exerted on the cable or wire by the clamp. In either type of drop wire clamp, it is important that the clamp does not degrade the quality of the signal carried by the cable or wire by damaging the signal-carrying cable or wire or the insulation of the cable or wire and does not otherwise damage the cable or wire, thereby increasing the likelihood of failure of the cable or wire.

More specifically, a compression-type drop wire clamp secures the cable or wire with a compressive force. Compression-type designs may or may not use a trough to accept the cable or wire, but the distinguishing feature of the compression-type drop wire clamps is that the cable or wire is typically held within the clamp through some type of compressive force or pressure on the cable or wire.

One shortcoming with compression-type drop wire clamp designs is that they may damage the cable through the pressurized contact used to secure the cable or wire to the drop wire clamp. This shortcoming becomes particularly evident when compression-type drop wire clamps are used in conjunction with cables or wires that are relatively fragile or are more apt to suffer damage due to the compressive forces or pressure exerted on the cable or wire by the drop wire clamp. Due to the damage caused by the pressurized contact used to secure the cables, the signal carried by the cable is attenuated, disrupted, or interfered with, making prior art compression-type drop wire clamps unsuitable for use with such fragile cables or wire.

While a variety of different types of cables and wires have been found to be more fragile and more likely to be damaged when used with compression-type drop wire clamps, one type of cable or wire which has generally been found to be unsuitable for use with compression-type drop wire clamps is fiber optic-based cables and wires. This shortcoming of compression-type drop wire clamps has become more pronounced in recent years, as the use of fiber optics in cables and wires has greatly increased, particularly in the communications industry.

Fiber optic cables or wires may be constructed in a variety of ways, but generally include: (1) optical fibers; (2) a loose fitting tube or buffer coating; (3) a protective strength member; and (4) an outer jacket. The optical fiber or optical fibers are generally located at the core of the fiber optic cable. The fiber optic core is surrounded by a loose fitting tube or is covered in with a buffer coating. If a loose fitting tube is used, a plastic buffer tube having an inner diameter greater than the outer diameter of the fiber optic core typically surrounds the core. The plastic tube is sometimes filled with another material, such as silicone gel, to prevent the buildup of moisture between the loose fitting tube and the core. If the buffer coating is used, a thick coating of a plastic-type material is typically applied directly to the outside of the fiber optic core. The use of the buffer coating generally allows the final fiber optic able to be smaller in diameter and more flexible, but the cable is less resistant to external forces. A protective strength member generally surrounds, or is located adjacent to but not surrounding (for example, in the form of Kevlar® strength members which run coextensive with the fiber optic core), the loose fitting tube or the buffer coating. The protective strength member gives strength to the final fiber optic cable and helps the cable resist damage. Finally, the outer jacket is generally made of a PVC material, or some other similar material, and surrounds the other components of the fiber optic cable in order to protect the components from exposure to the elements.

Although the construction of fiber optic cables lessens the potential for damage to the fragile fiber-optic core in general uses, the construction of the fiber optic cables does not protect the fiber optic core from damage from compression-type drop wire clamps. As a result, the use of conventional compression-type drop wire clamps with fiber optic cables damages the cables, typically by crushing or damaging the fiber optic core through the increased compressive force and pressure subjected on the cable by the drop wire clamp. Thus, conventional compression-type drop wire clamps have been found to be ill-suited to use with fiber optic cables. This limitation upon the use of compression-type drop wire clamps has become significant, as fiber optic cables and wires have become more common and often must be connected to supporting structures, such as poles and buildings.

SUMMARY

The drop wire clamp disclosed herein is a compression-type drop wire clamp that includes a housing, a mating slide assembly, which includes a hanger portion for securing the assembly to a supporting structure, and a shim located therebetween. A fiber optic cable (or any other type of suitable cable) is positioned between the housing and the shim.

One embodiment of the drop wire clamp disclosed herein avoids damaging the signal carrying portion of the cable (e.g., the portion with the fiber optics) by applying the compressive force primarily to a support portion of the cable (e.g., the portion with the Kevlar® strength members). For example, one or more recesses in the clamp may form a non-compression portion of the clamp to protect the signal carrying portion of the cable from excessive forces. A non-recessed portion of the clamp may be used to prevent the cable from slipping by applying the compressive force on the support portion of the cable.

Thus, the compressive force or pressure which holds the cable in place within the drop wire clamp is exerted primarily against the support portion of the cable and preferably little or no compressive force or pressure is exerted against the signal carrying portion, such as the fiber optic strands, of the cable. As a result, the drop wire clamp assembly may be used in conjunction with the cable without damaging or reducing the data transmission ability of the core, such as the fiber optic strands, carried therein, while still allowing a sufficient compressive force or pressure to be applied to the cable by the drop wire clamp assembly to hold the cable in position.

In an embodiment, the compression portion (e.g., the non-recessed portion) of the clamp defines a plurality of holes to increase the frictional force between the cable and the clamp. For example, a housing portion and/or a shim portion of the clamp may define the holes.

In an embodiment, an abrasive coating may be added to the clamp to increase the frictional force between the cable and the clamp. For example, the abrasive coating may be added to a housing portion of the clamp and/or a shim portion of the clamp (see FIG. 21). The abrasive coating may include any suitable combination of materials such as an enamel and crushed glass mixture. The abrasive coating and/or a shim may be used in any suitable clamp, including clamps designed to carry cables that do not include a signal carrying portion and a separate support portion (e.g., a standard coaxial cable).

In addition, tines or other aligning mechanisms may be used to center the cable in the clamp. By centering the cable in the clamp, the recessed portion of the clamp is properly aligned with the signal carry portion of the cable, and the non-recessed portion of the clamp is properly aligned with the support portion of the cable. These tines, or any other suitable cable alignment portion, may also be used to align other portions of the clamp. For example, the cable alignment tines may also cooperate with notches in a shim portion of the clamp to align the shim portion in the housing of the clamp.

BRIEF DESCRIPTION OF THE DRAWINGS

FIG. 1 is a perspective view of an example clamp assembly attached to a supporting structure.

FIG. 2 is an exploded perspective view of the example clamp assembly of FIG. 1.

FIG. 3 is a perspective view of the example clamp assembly of FIG. 1 as viewed from the bottom.

FIG. 4 is a cross-sectional view of the example clamp assembly of FIG. 1 taken substantially along line 4-4 of FIG. 3.

FIG. 5 is a plan view of the example housing of the example clamp assembly of FIG. 1.

FIG. 6 is a side elevational view of the example housing of FIG. 5.

FIG. 7 is bottom view of the example housing of FIG. 5.

FIG. 9 is a plan view of the example slide assembly and the example hanger portion of the example clamp assembly of FIG. 1.

FIG. 10 is a front elevational view of the example slide assembly and the example hanger portion of FIG. 9.

FIG. 19 is a front elevational view of the example slide assembly for a circular cable.

FIG. 20 is a front elevational view of an example housing for a circular cable.

FIG. 21 is a plan view of the example shim with an abrasive coating.

DETAILED DESCRIPTION OF EXEMPLARY EMBODIMENTS

Figure 8A:
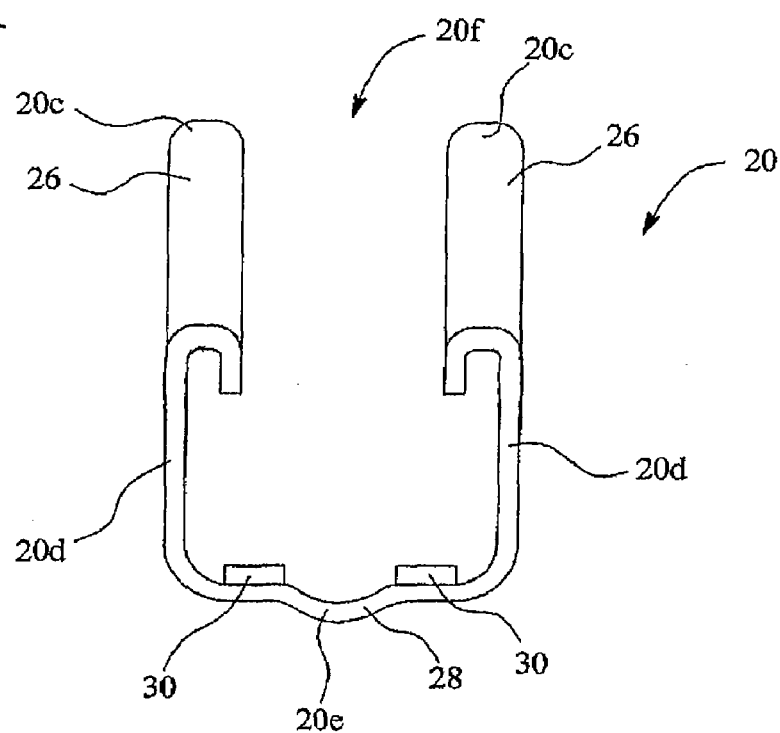
FIG. 8a is a front elevational view of the example housing of FIG. 5 with projections.

Referring to FIG. 1, a drop wire clamp assembly 10 is illustrated which secures and supports an insulated electrical cable, such as a fiber optic cable 12, to a supporting structure 14 to which the cable is being run. For example, the electrical cable may be a fiber optic telecommunications cable being strung between a telephone utility pole and a building. The supporting structure 14 may be a telephone utility pole, a building, or any other suitable structure which may be used to suspend cables or wires. The supporting structure 14 includes an attachment structure 16 for securing the drop wire clamp assembly 10 to the structure 14.

While the attachment structure 16 illustrated is in the form of a pair of hooks 16a secured to the side of the attachment structure 16, any other suitable attachment structure may be used. The drop wire clamp assembly 10 includes a hanger portion 18 which engages the attachment structure 16. Preferably, where hooks 16a are used as part of the attachment structure 16, the hanger portion 18 may be looped over both hooks 16 in order to provide a more secure attachment to the supporting structure 14.

As illustrated in FIGS. 2-4, the drop wire clamp assembly 10 includes the housing 20, the mating slide assembly 24, which includes the hanger portion 18 for securing the assembly to the supporting structure 14, and the shim 22 located therebetween. The fiber optic cable 12 is sandwiched between the housing 20 and the shim 22.

The drop wire clamp assembly 10 secures the fiber optic cable 12 by compressive force or pressure in such a way that the fiber optic wire or cable 12 is not damaged. Preferably, the cable 12 is secured between a housing 20 and a shim 22 by pressure applied thereon by a slide assembly 24. The drop wire clamp assembly 10 serves to reduce or remove the tension on the fiber optic cable 12 after the clamp 10 at the supporting structure 14. The fiber optic cable 12 is thereby held in position by the drop wire clamp assembly 10 and may continue onto its final destination, such as a junction box or other connection. Optionally, the cable 12 may be looped over the attachment structure 16 after being secured in place with the drop wire clamp assembly 10 in order to provide slack in the cable 12 between the drop wire clamp assembly 10 and the attachment structure 16. The slack in the cable 12 also allows the drop wire clamp assembly 10 to be shifted relative to the attachment structure 16, such as by the wind or other elements, without stretching or damaging the cable 12.

As shown in FIGS. 5-7, the housing 20 has a tapered shape, with a first end 20a having a height that is less than that of a second end 20b and top edges 20c which form an angle relative to the horizontal. While the height of the first end 20a and the height of the second end 20b may be any dimensions that are sufficient to accept the cable 12, preferably the ratio of the height of the second end 20b to the height of the first end 20a is approximately 1.7. Likewise, the angle of the top edges 20c maybe any angle which is sufficient to allow the slide assembly 24 to mate with the housing 20, but preferably the top edges 20c have an angle of approximately 6 degrees relative to the horizontal. The housing 20 may have any size and dimensions sufficient to accept the cable 12. For example, the housing 20 may have a length of about 3.375 inches, a height at the first end 20a of about 0.510 inches, a height at the second end 20b of about 0.865 inches, and a width of about 0.564 inches.

Figure 8B:
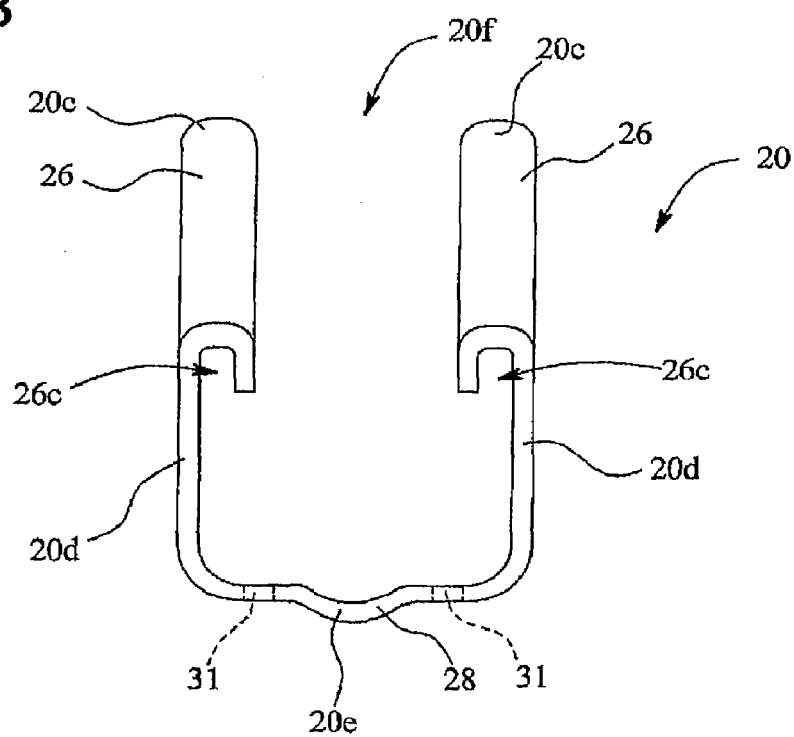
FIG. 8b is a front elevational view of the example housing of FIG. 5 with holes.

As illustrated in FIG. 8a and FIG. 8b, the housing 20 has a U-shaped cross-section and includes a pair of side walls 20d and a center wall or base 20e. The side walls 20d extend along a longitudinal direction and have a tapered configuration, as illustrated in FIG. 6. The U-shape of the housing 20 creates an interior channel 20f within which the cable 12 may be received.

The top edges 20c of the side walls 20d are each bent inward to form a pair of tracks 26 for receiving and guiding the slide assembly 24. The tracks 26 define a track channel 26a for receiving the slide assembly 24 may be received. That is, top edges 24c of side walls 24d of the slide assembly 24 may be slidably engaged within the track channels 26a of the tracks 26. The tracks 26 and track channels 26a may have any dimensions which are sufficient to allow the tracks 26 to receive the slide assembly 24. For example, the tracks 26 may have an outside width of 0.124 inches and the track channel 26a may have a width of 0.060 inches and a depth of 0.079 inches, wherein the inner corners of the channels 26a have a radius of curvature of about 0.015 inches. The surface of the track channels 26a is preferably smooth, in order to facilitate the easy insertion of the slide assembly 24 into the housing 20.

Figure 14A:
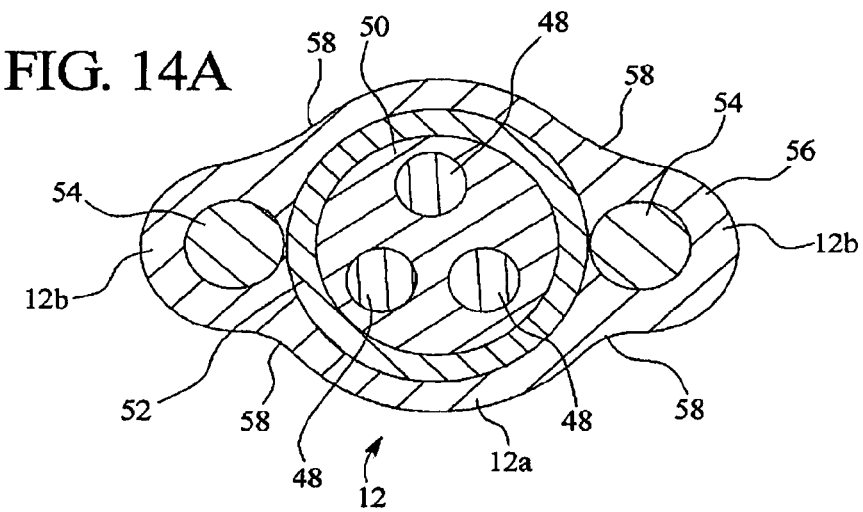
FIG. 14a is a cross-sectional view of an example "winged" fiber optic cable.
Figure 14B:
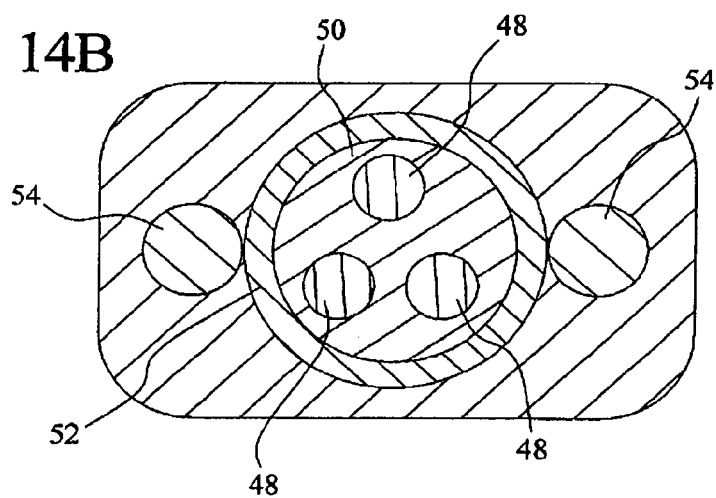
FIG. 14b is a cross-sectional view of example "flat" fiber optic cable.

The housing 20 may also includes a longitudinal recess or groove 28 that is sized and configured to receive the cable 12. A cross-section of an exemplar "winged" fiber optic cable 12 for use with the longitudinal groove 28 is illustrated in FIG. 14a. A cross-section of an exemplar "flat" fiber optic cable 12 is illustrated in FIG. 14b. In either case, the cable 12 has an elongated cross-section, wherein the width of the cable 12 is greater than its height. Generally, the cable 12 includes a signal-carrying, or transmission, portion 12a and a support, or non-signal-carrying, portion 12b surrounded by an outer jacket 56. In particular, the support portion 12b is generally coextensive with the signal-carrying portion 12a of the cable 12. The cable 12 includes a core of fiber optic strands 48, but the core may alternatively include a single fiber optic strand or a bundle of a plurality of fiber optic wire strands. The core of fiber optic strands 48 is surrounded by a flexible moisture resistant material 50, such as silicone gel, which prevents the buildup of moisture surrounding the fiber optic strands 48. A loose fitting flexible tube 52 surrounds the core fiber optic strands 48 and the moisture resistant material 50. The flexible tube 52 is preferably made of plastic, but other suitable materials may also be used. The signal-carrying portion 12a of the fiber optic cable 12 generally comprises the fiber optic strands 48, the moisture resistant material 50, and the flexible tube 52.

The cable 12 may also include a pair of protective strength members 54 which are mounted adjacent to the flexible tube 52 opposite sides to run coextensive with the signal-carrying portion 12a. The strength member 54 may form "wings" which extend outward from the signal-carrying portion 12a of the cable 12 (as shown in FIG. 14a), or the strength member 54 may be substantially "flat" with respect to the signal-carrying portion 12a of the cable 12 (as shown in FIG. 14b). The strength members 54 may comprise any material which imparts strength to the cable 12. For example, the strength members may be strands of Kevlar®. The support, or non-signal carrying, portion 12b of the cable 12 comprises the strength members 54.

The signal-carrying portion 12a and support portion 12b of the cable 12 are covered by the outer jacket 56. The outer jacket 56 completely surrounds the interior of the cable 12. The outer jacket 56 is preferably constructed of a plastic material, but any suitable material may be used to form the outer jacket 56.

Figure 18:
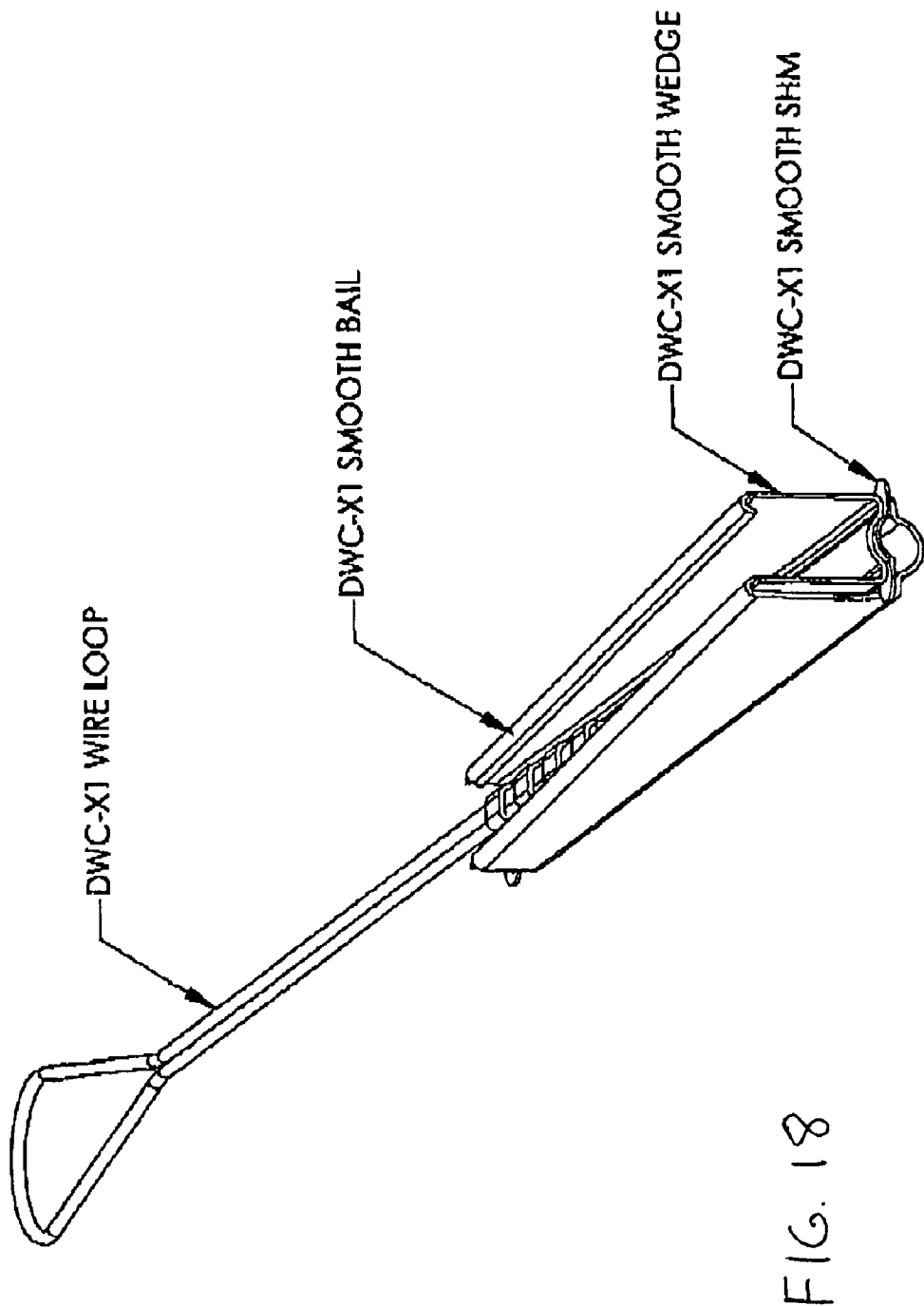
FIG. 18 is a perspective view of an example clamp assembly for a circular cable.

While reference to the configuration of a "winged" cable 12 and a "flat" cable 12 is made herein, it should be appreciated that the clamp 10 may be used in conjunction with other cables having different configurations and particularly in connection with cables having a signal-carrying portion and at least one coextensive support portion. For example, FIGS. 18-20 illustrate a clamp adapted for use with a circular cable 12. In addition, while reference is made herein to fiber optic cables, it will be recognized that the clamp 10 may be used in conjunction with other types of cables.

The longitudinal groove 28 is sized to receive the cable 12 therein. Preferably, the longitudinal groove 28 is sized to have dimensions that are slightly larger than the outer dimensions of the signal-carrying portion 12a of the cable 12. That is, preferably the longitudinal groove 28 is sized such that the signal-carrying portion 12a of the cable 12 is in clearance with the longitudinal groove 28, or in substantial clearance therewith, when the cable 12 is received therein. For example, the longitudinal groove 28 may have a width of about 0.173 inches, a depth of about 0.030 inches, and have a radius of curvature of about 0.099 inches when used with the exemplar cable 12. The longitudinal groove 28 may also include notches 28a in the center base 20e at the first end 20a and second end 20b of the housing 20 in order to better receive the cable 12. For example, the notches 28a may be semi-circular in shape and have a radius of curvature of about 0.078 inches.

The longitudinal groove 28 of the housing 20 is preferably located at the centerline of the center base 20e of the housing 20. That is, the longitudinal groove 28 is located at the midpoint of the center base 20e and extends longitudinally from the first end 20a of the housing 20 to the second end 20b of the housing 20.

Figure 11:
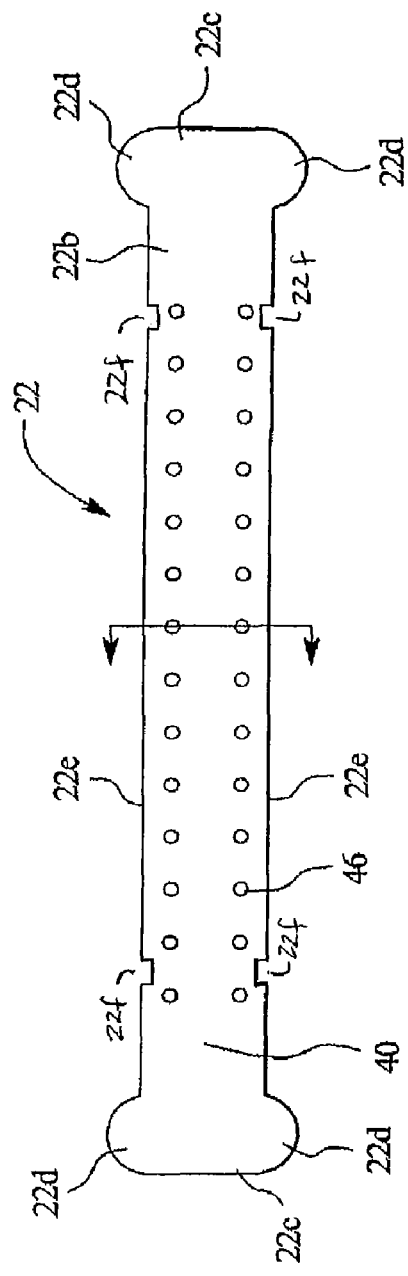
FIG. 11 is a plan view of the example shim of the example clamp assembly of FIG. 1.
Figure 12:
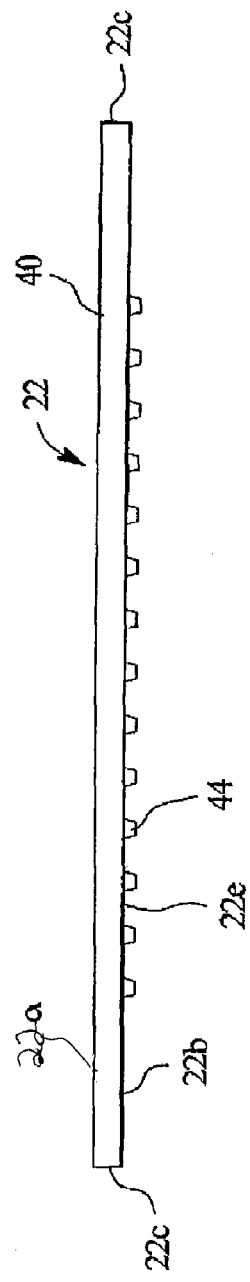
FIG. 12 is a side elevational view of the example shim of FIG. 11.
Figure 13A:
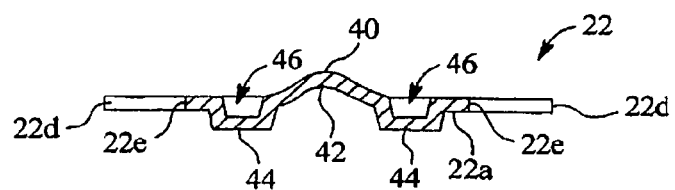
FIG. 13a is a cross-sectional view of an example shim with projections taken substantially along line 13-13 of FIG. 11.
Figure 13B:
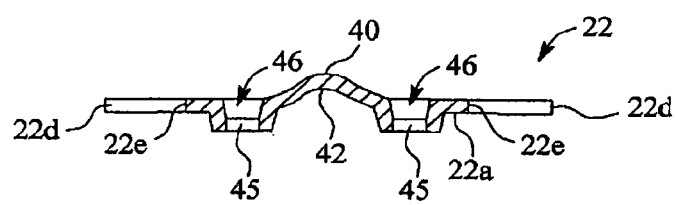
FIG. 13b is a cross-sectional view of an example shim with holes taken substantially along line 13-13 of FIG. 11.
Figure 15:
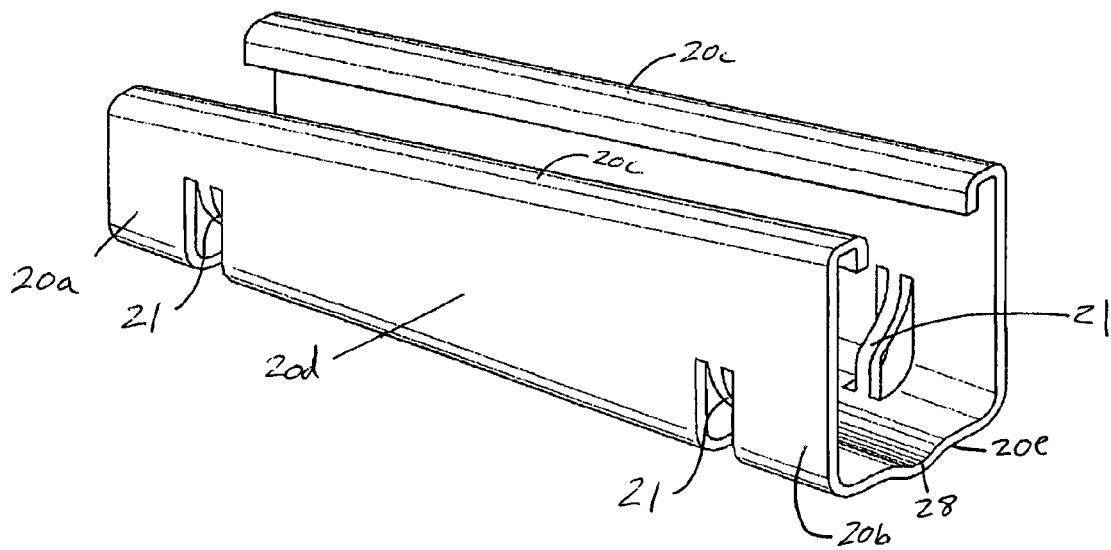
FIG. 15 is an perspective view of the example housing of FIG. 5 with alignment tines.
Figure 16:
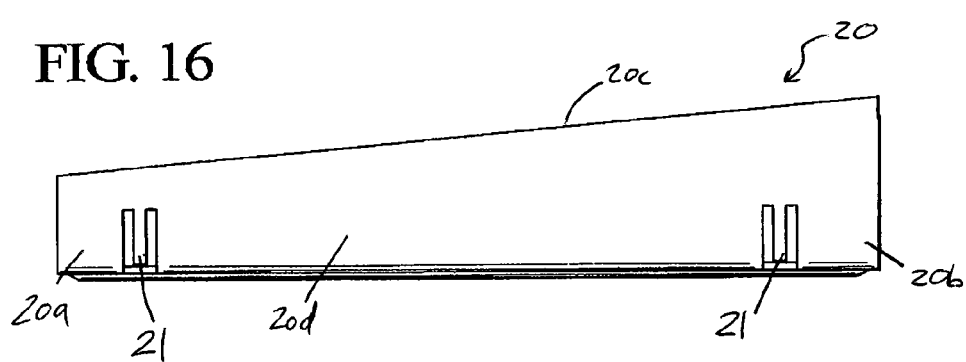
FIG. 16 is a side elevational view of the example housing of FIG. 5 with alignment tines.
Figure 17:
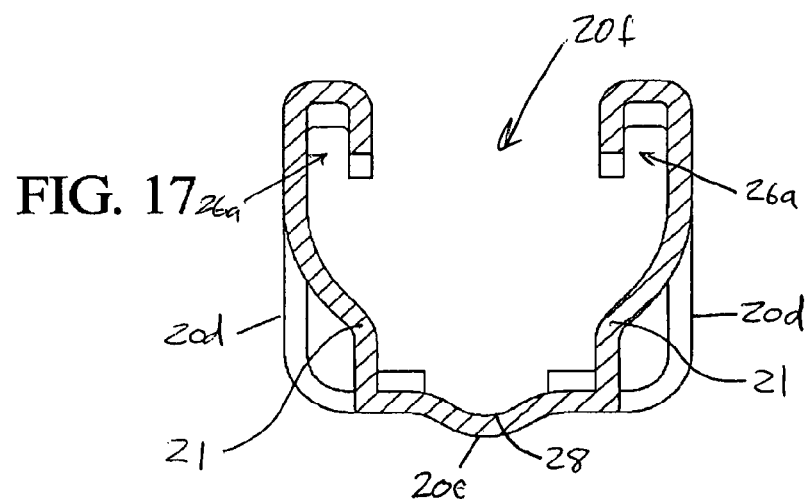
FIG. 17 is a front elevational view of the example housing of FIG. 5 with alignment tines.

In addition, the housing 20 may include one or more cable centering portions. For example, the housing 20 may include one or more pairs of tines 21 that are sized and configured to center the cable 12 as shown in FIG. 15, FIG. 16, and FIG. 17. In one embodiment, the tines 21 are formed by cutting a portion of the housing 20 and pushing that portion of the housing 20 into the interior channel 20f of the housing 20. The cable centering portion may also be used to align other portions of the drop wire clamp assembly 10. For example, the tines 21 may cooperate with notches 22f (see FIG. 11) in the shim 22 to align the shim 22 in the housing 20.

The center base 20e of the housing 20 preferably includes a gripping surface used in securing the fiber optic cable 12. The gripping surface enables the drop wire clamp assembly 10 to facilitate an enhanced hold or grip on the fiber optic cable 12 as it is pressed against the housing 20. While the gripping surface provides the drop wire clamp assembly 10 with this enhanced gripping feature when the cable 12 is pressed against the housing 20, the gripping surface is such that it allows the cable 12 to slide in a longitudinal direction within the housing 20 prior to the assembly of the drop wire clamp assembly 10. The gripping surface may be in the form of any suitable surface which increases the friction between the housing 20 and the cable 12. For example, the gripping surface may be in the form of projections 30 and/or holes 31 (i.e., a portion of the clamp defines the holes and a rim associated with the defined hole forms a surface).

The projections 30 and/or holes 31 may have any suitable size which is sufficient to secure the cable 12 to the drop wire clamp assembly 10. Likewise, the projections 30 and/or holes 31 may have any suitable shape, such as circular or elongated. The projections 30 are preferably elongated in a direction which is transverse to the longitudinal direction of the cable. For example, the projections 30 may have a width of about 0.092 inches, a length of about 0.066 inches, and a depth of about 0.030 inches. The holes 31 are preferably circular, but may be any suitable shape. For example, the holes 31 may have a diameter of about 0.046 inches. When holes 31 are used, the material of the cable 12 projects into the holes 31 when the cable 12 is compressed in the clamp assembly 10 thereby increasing the gripping surface area of the clamp assembly 10.

The projections 30 and/or holes 31 may be formed in the center base 20e of the housing 20 in any suitable manner. For example, the housing may be stamped, punched, or drilled. In one embodiment, indentations 32 (or holes) are formed on the outside of the center base 20e and the projections 30 on the inside of the center base 20e. The projections 30 are formed in such a way so that they do not have any relatively sharp or jagged edges. Any suitable forming operation which breaks all sharp corners and edges, or prevents there formation entirely, so that the surface of the projections 30 remains relatively smooth, is acceptable. For example, the projections 30 may be formed in a way that forms edges on the projections 30 that have a radius of curvature that is small enough to sufficiently secure the cable 12 within the drop wire clamp assembly 10, yet are large enough to prevent damage to the cable 12 by the edges. Preferably, the radius of curvature of the edges of the projections 30 which lie in a direction transverse to the longitudinal axis of the housing 20 is less than that of the edges of the projections 30 extending on the longitudinal direction. For example, the preferred configuration may be formed by using a stamp which has a "D" shaped flattened tip, wherein the curved edges of the "D" are oriented downward and in a direction which is transverse to the longitudinal direction and edges of the flattened tip are oriented in the longitudinal direction.

The projections 30 and/or holes 31 may be located anywhere on the center base 20e of the housing 20 and have any suitable configuration that allows the cable 12 to be secured thereby. Preferably, the projections 30 and/or holes 31 are disposed immediately adjacent the longitudinal groove 28, but do not extend into the longitudinal groove 28. For example, the projections 30 and/or holes 31 are configured in two longitudinal rows, with each row located adjacent to, but not extending into, the longitudinal groove 28, between the longitudinal groove 28 and the side walls 20d.

More preferably, as illustrated in FIG. 4, the location of the projections 30 and/or holes 31 is such that the projections 30 and/or holes 31 engage the support portion 12b of the cable 12 but do not engage the signal-carrying portion 12a of the cable 12. The preferred location of the projections 30 and/or holes 31 is such that the projections 30 and/or holes 31 contact the cable 12 adjacent the strength members 54. The longitudinal rows of projections 30 and/or holes 31 preferably extend over the entire length of the housing 20. For example, the projections 30 and/or holes 31 may be separated by about 0.187 inches on center.

Optionally, the surface of the housing 20, the surface of the center base, and/or the surface of the projections 30, may include an abrasive surface which may be used as the gripping surface, either alone or in combination with the projections 30 and/or holes 31. For example, the surface of the housing 20 may be subjected to a sandblasting process, which creates a rough surface from the housing material.

In another embodiment, the surface of the housing 20, the surface of the center base, and/or the surface of the projections 30, may include an abrasive coating which may be used as the gripping surface, either alone or in combination with the projections 30 and/or holes 31. Preferably, the abrasive coating includes a pliable substrate and a coarse additive. For example, an enamel and crushed glass mixture may be applied to the surface of the surface of the housing 20, the surface of the center base, and/or the surface of the projections 30. Other abrasive examples include, but are not limited to, adding aluminum oxide, metal, sand, and/or glass to epoxy, glue, and/or enamel.

Preferably, the housing 20 is constructed of stainless steel for added protection against corrosion and other similar damage from exposure to the elements. For example, the housing 20 may be constructed of 0.032 inch stainless steel. However, any suitable material having sufficient strength and rigidity, and preferably resistance to corrosion, may be used for the construction of the housing 20 in place of stainless steel.

As illustrated in FIGS. 2, 9, and 10, the slide assembly 24 has a tapered shape, with a first end 24a having a height that is less than that of a second end 24b, and top edges 24c which form an angle relative to the horizontal. The height of the first end 24a and the height of the second end 24b may be any that are sufficient to be received by the housing 20, preferably the ratio of the height of the second end 24b to the height of the first end 24a is about 2.56. Likewise, the angle of the top edges 24c may be any angle which is sufficient to allow the slide assembly 24 to mate with the housing 20, but preferably, the top edges 24c have an angle of approximately 6 degrees relative to the horizontal.

More specifically, it is preferred that the angle of the top edges 24c of the slide assembly 24 be substantially the same as the angle of the top edges 20c of the housing 20. The slide assembly 24 may have any size and dimensions sufficient to allow the slide assembly 24 to be received by and mate with the housing 20. For example, the slide assembly 24 may have a length of about 3.750 inches, a height at the first end 24a of about 0.253 inches, a height at the second end 24b of about 0.865 inches, and a width of about 0.482 inches.

Preferably, the slide assembly 24 has a length which is greater than the length of the housing 20, such that the second end 24b of the slide assembly 24 extends slightly beyond the second end 20b of the housing 20 when the slide assembly 24 is mated with the housing 20.

The slide assembly 24 preferably includes the hanger portion 18, such that ends 18a of the hanger portion 18 are attached to the slide assembly 24, as illustrated in FIG. 9. While the hanger portion 18 alternatively may be connected to the drop wire clamp assembly 10 at a location other than the slide assembly 24, the connection of the hanger portion 18 to the slide assembly 24 allows the weight of the cable 12 to securely mate the slide assembly 24 within the housing 20.

Preferably, the slide assembly 24 is constructed of stainless steel for added protection against corrosion and other similar damage from exposure to the elements. For example, the slide assembly 24 may be made of 0.032 inch stainless steel. However, any material having sufficient strength and rigidity, and preferably resistance to corrosion, may instead be used for the construction of the slide assembly 24.

As shown in FIG. 10, the slide assembly 24 has a U-shaped cross-section having a pair of side walls 24d, extending in a longitudinal direction and having a tapered configuration, and a center wall or base 24e. The U-shape of the slide assembly creates an interior channel 24f therein.

The center base 24e includes a plurality of upwardly punched hoops 34 extending upward from the bottom of the slide assembly 24. The hoops 34 extend upward to form apertures 36 in the bottom surface of the slide assembly 24 which may receive ends 18a of the hanger portion 18. The hoops 34 and the apertures 36 may have any suitable configuration. For example, there may be two parallel longitudinal rows of four hoops 34, as illustrated in FIGS. 9 and 10, wherein the hoops 34 have a length of about 0.250 inches, a width of about 0.150 inches, and are separated by about 0.150 inches and the apertures 36 have a diameter of about 0.086 inches.

Alternatively, the slide assembly may include a single longitudinal row of hoops, rather than a pair of longitudinal row as discussed herein, that may receive the ends of the hanger portion. For example, the hoops of the single longitudinal row may have a length of about 0.250 inches, a width of about 0.243 inches, and are separated by about 0.300 inches and the apertures are in the form of a rectangular loop with a width of about 0179 inches and a height of about 0.076 inches.

After the end portions 18a of the hanger portion 18 are inserted into the apertures 36 formed by the hoops 34, the hoops 34 are crimped to secure the hanger portion 18 therein. The preferred crimping deforms the hoops 34 and the end portions 18a to form an intimate interfitting therebetween. The crimped hoops 34 enable the connection between the slide assembly 24 and the hanger portion 18 to withstand a considerable separation force without breaking, slipping, or pulling out of the hoops 34. Preferably, the connection between the hanger portion 18 and the slide assembly 24 can withstand a separation force in excess of 555 pounds.

The center base 24e preferably includes a longitudinal groove 38 that may receive a longitudinal bulge 40 of a top surface 22a of the shim 22. The opposite side of the bulge 40 defines a longitudinal recess or groove 42 in a bottom surface 22b of the shim 22. The longitudinal groove 38 of the center base 24e of the slide assembly 24 is preferably sized to cooperate with the longitudinal bulge 40 of the shim 22. For example, the longitudinal groove 38 of the slide assembly 24 may have a width of approximately 0.220 inches, a depth of about 0.39 inches, and a radius of curvature of about 0.068 inches. However, the slide assembly 24 may alternatively have a flat center base which does not include a longitudinal groove. Additionally, the preferred bottom surface of the slide assembly 24 is smooth, so as to better slide over the top surface 22a of the shim 22 when the drop wire clamp assembly 10 is being installed.

As shown in FIG. 11, FIG.12, FIG. 13a, and FIG. 13b, the shim 22 has a substantially elongated rectangular shape. The dimensions of the shim 22 are such that the shim 22 may be received in the interior channel 20f of the housing 20. For example, the shim 22 may have a width of about 0.420 inches and a length of about 3.925 inches.

Each end of the shim 22 preferably terminates with an enlarged, transversely extending end portion 22c with a pair of curved lobes 22d. Each end portion 22c is located and sized such that the shim 22 may be longitudinally captured within the housing 20, so as to limit the longitudinal motion of the shim 22 within the housing 20. For example, each end portion 22c may have a width of approximately 0.690 inches and a length of about 0.250 inches and the curved lobes 22d each may have a radius of curvature of about 0.125 inches. Additionally, the end portions 22c allow the installer to hold and tilt the shim 22 within the housing 20 to assist in the insertion of the shim 22 therein.

The shim 22 may also include notches 22f which accept the tines 21 located in the housing 20. In this manner, the shim 22 is easily assembled with the housing 20.

The shim 22 may also includes a longitudinal recess or groove 42 which is capable of receiving the cable 12 in the bottom surface 22b of the shim 22. The presence of the longitudinal groove 42 in the bottom surface 22b of the shim 22 causes the longitudinal bulge 40 to be formed in the top surface 22a of the shim 22 opposite the groove 42. Both the longitudinal groove 42 and the longitudinal bulge 40 are preferably located at the longitudinal centerline of the shim 22.

The longitudinal groove 42 is sized to receive the cable 12 therein. Preferably, the longitudinal groove 42 is sized to have dimensions that are slightly larger than the outer dimensions of the signal-carrying portion 12a of the cable 12. That is, preferably the longitudinal groove 42 is sized such that the signal-carrying portion 12a of the cable 12 is in clearance with the longitudinal groove 42, or in substantial clearance therewith, when the cable 12 is received therein. For example, the longitudinal groove 42 may have a width of approximately 0.25 inches, a depth of approximately 0.035 inches, and a radius of curvature of about 0.068 inches for use with cable 12.

The shim 22 includes a gripping surface that facilitates securement of the fiber optic cable 12. The gripping surface enables the drop wire clamp assembly 10 to better hold or grip the cable 12 as it is pressed between the shim 22 and the housing 20. While the gripping surface enables the drop wire clamp assembly 10 to better hold or grip the cable 12 when the cable 12 is pressed against the housing 20, the gripping surface is such that it allows the cable 12 to slide in a longitudinal direction within the housing 20 before the cable 12 is pressed between the shim 22 and the housing 20 by the slide assembly 24. The gripping surface may be in the form of any suitable surface which increases the frictional engagement of the cable 12 by the shim 22, but preferably, the gripping surface is in the form of projections 44 and/or holes 45 (i.e., a portion of the clamp defines the holes and a rim associated with the defined hole forms a surface).

The projections 44 and/or holes 45 may have any suitable size which is sufficient to secure the cable 12 to the drop wire clamp assembly 10. Likewise, the projections 44 and/or holes 45 may have any suitable shape, such as circular or elongated. For example, if projections 44 are used, the projections 44 may have a diameter of about 0.085 inches and a depth of about 0.350 inches. If holes 45 are used, the holes 45 may have a diameter of about 0.046 inches.

The projections 44 and/or holes 45 may be formed in the shim 22 in any suitable manner. For example, the shim 22 may be stamped, punched, or drilled. In one embodiment, indentations 46 (or holes) are formed in the top surface 22a of the shim 22, resulting in the projections 44 in the bottom surface 22b of the shim 22. Any suitable forming operation which breaks all sharp corners and edges, or prevents there formation entirely, so that the surface of the projections 44 remains smooth, is acceptable. More specifically, the projections 44 are formed in the shim 22 in such a way that no sharp or jagged edges are formed on the projections 44 or the shim 22. For example, the projections 44 may be formed in a way that forms edges on the projections 44 that have a radius of curvature that is small enough to sufficiently secure the cable 12 within the drop wire damp assembly 10, yet is large enough to prevent damage to the cable 12 by the edges. For example, the projections may be formed by punching or stamping the shim 22 with a stamp which has a circular tip having a small diameter, such as about 0.060 inches. Alternatively, the projections 44 may have different shapes or configurations. For example, the projections 44 may be formed to have an elongated configuration, such as projections 44 formed by using a stamp which has a "D" shaped flattened tip, wherein the curved edges of the "D" are oriented downward and in a direction which is transverse to the longitudinal direction and edges of the flattened tip are oriented in the longitudinal direction, as discussed above in connection with the projections 30 of the housing 20.

The projections 44 and/or holes 45 maybe located anywhere on the shim 22 and have any suitable configuration that allows the cable 12 to be secured thereby. Preferably, the projections 44 and/or holes 45 are disposed immediately adjacent the longitudinal groove 42 but do not extend into the longitudinal groove 28. For example, the projections 44 and/or holes 45 may be configured in two longitudinal rows, with each row located adjacent to, but not extending into, the longitudinal groove 42, between the longitudinal groove 42 and the side edges 22e of the shim 22. More preferably, as illustrated in FIG. 4, the projections 44 and/or holes 45 are located on the shim 22 such that the projections 44 and/or holes 45 engage the support portion 12b of the cable 12 but do not engage the signal-carrying portion 12a of the cable 12. That is, the location of the projections 44 and/or holes 45 is such that the projections 44 and/or holes 45 contact the cable 12 adjacent the strength members 54. The longitudinal rows of projections 44 and/or holes 45 preferably extend over substantially the entire length of the shim 22. For example, the projections 44 and/or holes 45 may be separated by about 0.210 inches on center.

Optionally, the surface of the shim 22, the surface of the longitudinal groove 28, and/or the surface of the projections 44 may include an abrasive surface which may be used as the gripping surface, either alone or in combination with projections 44 and/or holes 45. For example, the surface of the housing may be subjected to a sandblasting process, which creates a rough surface on the shim 22.

In another embodiment, the surface of the shim 22, the surface of the longitudinal groove 28, and/or the surface of the projections 44, may include an abrasive coating which may be used as the gripping surface, either alone or in combination with the projections 44 and/or holes 45. Preferably, the abrasive coating includes a pliable substrate and a coarse additive. For example, an enamel and crushed glass mixture may be applied to the surface of the shim 22, the surface of the longitudinal groove 28, and/or the surface of the projections 44. Other abrasive examples include, but are not limited to, adding aluminum oxide, metal, sand, and/or glass to epoxy, glue, and/or enamel.

Preferably, the shim 22 is constructed of stainless steel for added protection against corrosion and other similar damage that maybe caused by exposure to the elements. More preferably, the shim may be made of 0.020 inch stainless steel. However, any suitable material having sufficient strength and rigidity, and preferably resistance to corrosion, may be used for the construction of the shim 22 in place of stainless steel.

The drop wire clamp assembly 10 also includes the hanger portion 18 for securing the drop wire clamp assembly 10 to the attachment structure 116 of the supporting structure 114. The hanger portion 118 is preferably in the form of a wire loop 18b extending from the slide assembly 24. As discussed above, the ends 18a of the hanger portion 18 are secured to the slide assembly 24 by crimped hoops 34 of the slide assembly 24. However, alternative forms of the hanger portion may also be used, such as a hanger portion which is integral with one of the components of the drop wire clamp assembly, and the hanger portion may alternatively be attached to the drop wire clamp assembly in locations other than the slide assembly.

Preferably, the hanger portion 18 is constructed of stainless steel wire for added protection against corrosion and other similar damage from exposure to the elements. For example, the hanger portion 18 may be constructed of 0.081 inch diameter annealed stainless steel wire. However, any suitable material having sufficient strength and rigidity, and preferably resistance to corrosion, may be used for the construction of the hanger portion 18.

The hanger portion 18 includes a pair of arms 18c, a loop 18e, and curved portions 18d connecting the arms 18c to the loop 18e. The hanger portion 18 has dimensions which are large enough to provide sufficient clearance between the housing 20, shim 22, and slide assembly 24 and the supporting structure 14, such that the operation of the drop wire clamp assembly 10 is not interfered with and that the cable 12 has sufficient room to travel to its final destination. The loop 18e of the hanger portion 18 also has dimensions sufficient to enable the hanger portion 18 to be attached to the attachment structures 16 of the supporting structure 14. For example, the hanger portion 18 may have an overall length of about 6.781 inches, the arms 18c may have a length of about 4.469 inches and be separated by about 0.220 inches on center, the loop 18e may have a radius of curvature of about 0.460 inches, and the curved portions 18d may have a radius of curvature of about 2.040 inches.

A segment of the arms 18c which is sufficient to provide sufficient strength to the connection between the slide assembly 24 and the hanger portion 18 may be held within the crimped hoops 34 of the slide assembly 24. For example, about 1.681 inches of the hanger portion 18 may be located within the interior channel 24f of the slide assembly 24 and held therein by the crimped hoops 34, while about 5.10 inches of the hanger portion 18 may extend beyond the first end 24a of the slide assembly 24. Preferably, this connection between the hanger portion 18 and the slide assembly 24 can withstand a separation force in excess of 555 pounds.

In some cases, it may be desirable to provide an insulated connection between the drop wire clamp assembly 10 and the supporting structure 14. In such cases, at least a portion of the hanger portion 18 may be insulated. For example, the hanger portion may include a portion thereof which is covered with an insulating material or which includes an insulating material that has been molded thereon. Alternatively, the insulation may be provided by an insert constructed of an insulating material, such as polyurethane, which may be secured to the hanger portion 18, and particularly within the wire loop 18e of the hanger portion 18. In either event, the insulating material provides an insulated connection between the drop wire clamp assembly 10 and the supporting structure 14.

Generally, when the drop wire clamp assembly 10 is to be utilized, the installer inserts the fiber optic cable 12 into the housing 20, such that it lies within the longitudinal groove 28. The installer then grasps one of the end portions 22c of the shim 22 and tilts the shim 22 relative to the side walls 20d of the housing 20 and, then, places the shim 22 over the fiber optic cable 12, with the cable 12 within the longitudinal groove 42 of the shim 22. The notches 22f in the shim 22 align with the tines 21 of the housing 20 to help guide the shim 22 into place. The slide assembly 24 is then inserted into the housing 20 with the shorter end 24a being placed in the larger end 20b of the housing. The top edges 24c of the slide assembly 24 also are placed under the tracks 26. An installer or user can pull the hanger portion 18 to slide the slide assembly 24 in the longitudinal direction. The tapered side walls 24d, which engage the tracks 26 of the tapered housing 20, then guide the slide assembly 24 to move longitudinally along the tracks 26 and simultaneously cause the bottom surface of the slide assembly 24 to move downward against the shim 22, thus creating a clamping or compressive force or pressure between the housing 20 and the shim 22.

This motion firmly presses the projections 30 and/or holes 31 of the housing 20 and the projections 44 and/or holes 45 of the shim 22 against the support portions 12b of the cable 12. The projections and/or holes 30, 31, 44, 45 are pressed into the outer jacket 56 of the cable 12 adjacent the support portion 12a, thus firmly retaining the cable 12 within the drop wire clamp assembly 10.

In addition, an abrasive coating may be added to the clamp to increase the frictional force between the cable and the clamp. For example, the abrasive coating may be added to a housing portion of the clamp and/or a shim portion of the clamp. The abrasive coating may include any suitable combination of materials such as an enamel and crushed glass mixture. The abrasive coating and/or a shim may be used in any suitable clamp, including clamps designed to carry cables that do not include a signal carrying portion and a separate support portion (e.g., a standard coaxial cable).

Preferably, little or no clamping or compressive force or pressure is exerted against the signal-carrying or transmission portion 12a of the cable 12. More preferably, the signal-carrying portion 12a of the cable 12 is in clearance with the longitudinal grooves 28, 42 such that no force is exerted thereon. Once the cable 12 is firmly clamped within between the shim 22 and the housing 20, the hanger portion 18 may be hooked to the attachment structure 16 of the supporting structure 14, thus completing the installation of the drop wire clamp assembly 10.

As illustrated in FIG. 4, the cable 12 is sandwiched between the shim 22 and the housing 20, within the longitudinal groove 42 of the shim 22 and the longitudinal groove 28 of the housing 20. The configuration of the longitudinal grooves 28, 42, as well as the projections 44 and/or holes 45 of the shim 22 and the projections 30 and/or holes 31 of the housing 20, is such that the projections and/or holes 30, 31, 44, 45 contact the cable 12 at shoulders 58 of the cable 12 located adjacent the strength members 54 at the support portion 12b of the cable 12. That is, the projections and/or holes 30, 31, 44, 45 contact the cable 12 and exert a compressive force or pressure on the support portion 12b of the cable 12, rather than on the signal-carrying portion 12a of the cable 12, which typically contains a more fragile data transmission means, such as fiber optic strands 48.

Preferably, the projections and/or holes 30, 31, 44, 45 contact the cable 12 at the shoulders 58 of the cable 12, but the projections and/or holes 30, 31, 44, 45 may alternatively contact the cable 12 slightly outside the shoulders 58. More preferably, the projections and/or holes 30, 31, 44, 45 contact the support portion 12b of the cable 12 as close as possible to the signal-carrying portion 12a of the cable 12 without exerting force on the signal-carrying portion 12a, such that the surface area of the contact between the projections and/or holes 30, 31, 44, 45 and the support portion 12b of the cable 12 is maximized. That is, more preferably the inner edges of the projections and/or holes 30, 31, 44, 45 contact the support portion 12b of the cable 12 immediately adjacent the boundary between the signal-carrying portion 12a and support portion 12b of the cable 12.

The location and dimensions of the longitudinal grooves 28, 42 allow the portion of the cable 12 containing the data transmission means, such as fragile fiber optic strands 48, to be held in substantial relief from the compressive force of the drop wire damp assembly 10 within the longitudinal grooves 28, 42. That is, the signal-carrying portion 12a of the cable 12 is held within the drop wire clamp assembly 10 in such a way that little or no pressure or compressive force is exerted on the signal-carrying portion 12a. In one embodiment, the longitudinal grooves 28, 42 may cause the signal-carrying portion 12a of the cable 12 to be in clearance with the longitudinal grooves 28, 42, so as to form a small gap 60 between the outer jacket 56 of the cable 12 at the signal-carrying portion 12a and the surface of the longitudinal grooves 28, 42. In another embodiment, an abrasive coating may be added to the clamp to increase the frictional force between the cable and the clamp.

Thus, the compressive force or pressure which holds the cable 12 in place within the drop wire clamp assembly 10 is exerted only against the support portion 12b of the cable 12 and preferably little or no compressive force or pressure is exerted against the data transmission core, such as the fiber optic strands 48, of the cable 12. That is, the force is exerted only against the strength members 54 of the cable 12 within the support portion 12a. As a result, the drop wire clamp assembly 10 may be used in conjunction with the cable 12 without damaging or reducing the data transmission ability of the core, such as the fiber optic strands 48, carried therein, while still allowing a sufficient compressive force or pressure to be applied to the cable 12 by the drop wire clamp assembly 10 to hold the cable 12 in position. For example, the drop wire clamp assembly 10 may grip the support portions 12b of the cable 12 with a grip sufficient to withstand as much as about 600 pounds of longitudinal force attempting to pull the cable 12 out of the assembly 10, while little or no force is applied to the signal-carrying portion 12a of the cable 12 and no attenuation of the signal carried therein is exhibited.

While the specification and the corresponding drawings reference preferred embodiments, it should be appreciated that various changes may be made and equivalents maybe substituted for elements thereof without departing from the scope of the present invention as set forth in the following appended claims. In addition, many modifications may be made to adapt a particular situation or material to the teachings of the invention, as set forth in the appended claims, as defined in the appended claims, without departing from the essential scope thereof. Therefore, it is intended that the present invention not be limited to the particular embodiments illustrated by the drawings and described in the specification as the best modes presently contemplated for carrying out the present invention, but that the present invention will include any embodiments falling within the description of the appended claims and equivalents thereof.

The invention is claimed as follows:

1. A clamp to support a cable, the cable including a transmission portion and a support portion, the clamp comprising:
    a housing defining an interior configured to receive at least a portion of the cable, the housing defining a first plurality of holes or dimples configured to engage the cable, wherein the housing includes a pair of side walls and a center base, the center base defining the first plurality of holes or dimples, the center base including a first recess for receiving primarily the transmission portion of the cable, wherein the plurality of holes or dimples are defined by two longitudinal rows, with a first longitudinal row disposed between the first recess and a first side wall of the housing and a second longitudinal row disposed between the first recess and a second side wall of the housing;
    a slide receivable in the housing to create a clamping force between the slide and the housing;
    a shim being disposable in the housing between the housing and the slide, the clamping force causing a surface in the housing associated with the first plurality of holes or dimples to grip primarily the support portion of the cable; and
    a hanger attached to at least one of the housing, the slide, and the shim to support at least one of the housing, the slide, and the shim.

2. The clamp of claim 1, wherein the first recess is free of holes and dimples.

3. A clamp to support a cable, the cable including a transmission portion and a support portion, the clamp comprising:
    a housing defining an interior configured to receive at least a portion of the cable;
    a slide receivable in the housing configured to create a clamping force between the slide and the housing;
    a shim being disposable in the housing between the housing and the slide, the shim defining a plurality of holes or dimples for engaging the cable, wherein the plurality of holes or dimples are defined by two longitudinal rows, with a first longitudinal row disposed on a first side of the recess, and a second longitudinal row disposed on a second side of the recess, wherein the shim includes a recess for receiving primarily the transmission portion of the cable, the clamping force causing a surface in the shim associated with the plurality of holes or dimples to grip primarily the support portion of the cable; and
    a hanger attached to at least one of the housing, the slide, and the shim to support at least one of the housing, the slide, and the shim.

4. The clamp of claim 3, wherein the recess is free of holes and dimples.

* * * * *